SKEW ELIMINATION SYSTEM UTILIZING A PLURALITY OF BUFFER SHIFT REGISTERS

Filed Oct. 11, 1962

INVENTOR.
DAVID P. PERRY
BY Percy P. Lantzy
ATTORNEY

INVENTOR.
DAVID P. PERRY
BY Percy P. Lantzy
ATTORNEY

INVENTOR.
DAVID P. PERRY
BY Percy P. Lantzy
ATTORNEY

United States Patent Office 3,281,805 Patented Oct. 25, 1966

3,281,805
SKEW ELIMINATION SYSTEM UTILIZING A PLURALITY OF BUFFER SHIFT REGISTERS

David Phillips Perry, West Orange, N.J., assignor to International Telephone and Telegraph Corporation, Nutley, N.J., a corporation of Maryland Filed Oct. 11, 1962, Ser. No. 229,820
11 Claims. (Cl. 340—174.1)

This invention relates generally to a system for reading a magnetic tape having binary coded information in "1" and "0" bit form recorded thereon in a plurality of parallel tracks, and more particularly to a system for eliminating skew in corresponding bits on the track.

In the data processing technologies, it is customary to record binary coded information in a plurality of parallel tracks on magnetic tape, the recorded information being subsequently played back or read out to a computer or to other data processing links. The bits making up each character initially are magnetically recorded in parallel on the tape, i.e., the bits on each track of the tape being disposed in a line perpendicular to the length of the tape. It is desirable that the bits be read out simultaneously, i.e., in parallel, however, a number of factors such as misalignment of the reading and writing heads and of the tape during the recording and play-back operations, variations in tape speed, etc. result in relative displacement of the bits on the tape from the desired parallel relationship; this phenomenon is referred to as "skew."

When the character bits are recorded on magnetic tape at a low density, for example, on the order of five hundred (500) bits per inch, skewing of the bits does not present any particular problem. However, in the case of magnetic tapes, having relatively high density bit recording, for example, 2000 bits per inch, the problem of skew becomes acute. Apparatus for eliminating skew in high density recording systems has been proposed, however, such apparatus has been characterized by its complexity and thus substantial expense.

It is accordingly an object of the invention to provide an improved system for reading a magnetic tape having binary coded information in "1" and "0" bit form recorded thereon in a plurality of parallel tracks and for eliminating skew in corresponding bits on the tracks.

In accordance with the broader aspects of the invention, a system is provided wherein the signals played back from multi-track tape are passed through a corresponding number of parallel buffer shift register chains in asynchronous fashion. Each stage of each such chain comprises a three-stable flip-flop circuit which stores either a "1," a "0," or an "empty" condition, the latter condition indicating readiness of the stage to accept another input signal. By simultaneously processing the outputs of all of the last stages of these register chains, misalignment or skew of the signals applied to the input stages is corrected.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
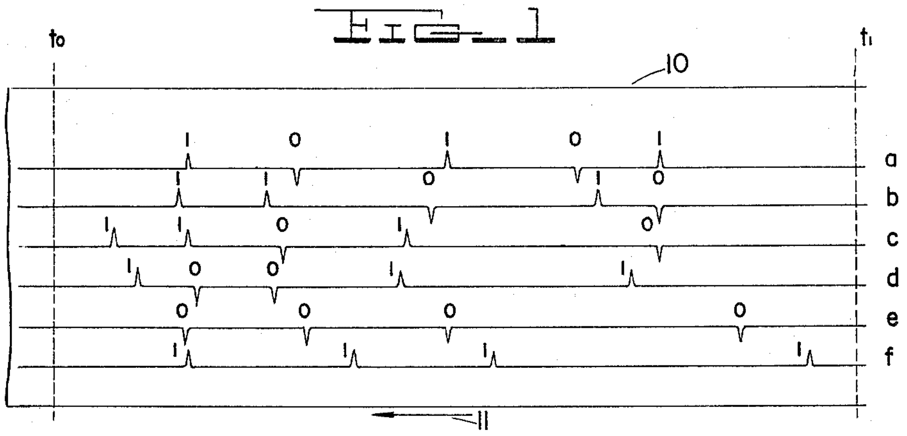
FIG. 1 is a diagram showing typical skewing of character bits recorded on six-track magnetic tape.

Referring now to FIG. 1, there is shown a section of magnetic tape 10 having six parallel recording tracks thereon identified as "*a*" through "*f*" respectively. Tape 10 is advanced in the direction shown by the arrow 11 by conventional tape drive means (not shown) and between the intervals $t_0$ and $t_1$, character bits are recorded in parallel as shown below:

| Character No. | Tracks | | | | | |
|---|---|---|---|---|---|---|
| | *a* | *b* | *c* | *d* | *e* | *f* |
| 1 | 1 | 1 | 1 | 1 | 0 | 1 |
| 2 | 0 | 1 | 1 | 0 | 0 | 1 |
| 3 | 1 | 0 | 0 | 0 | 0 | 1 |
| 4 | 0 | 1 | 1 | 1 | 0 | 1 |
| 5 | 1 | 0 | 0 | 1 | 0 | 1 |

Due, however, to the above-described various causes, the bits in each track have become relatively time displaced or skewed with respect to corresponding bits in the other tracks, as shown; it will be seen that the last two bits of character 5 in tracks "*e*" and "*f*" do not even appear during the interval $t_0$–$t_1$ due to the skew.

In referring to FIG. 1, it will be readily understood that the "1" and "0" bits are magnetically recorded with polarizations such that a "1" recorded bit produces a positive-going pulse in the output circuit of the pick-up head whereas a "0" recorded bit produces a negative-going pulse, these positive and negative-going output pulses being illustrated in FIG. 1.

Figure 2:
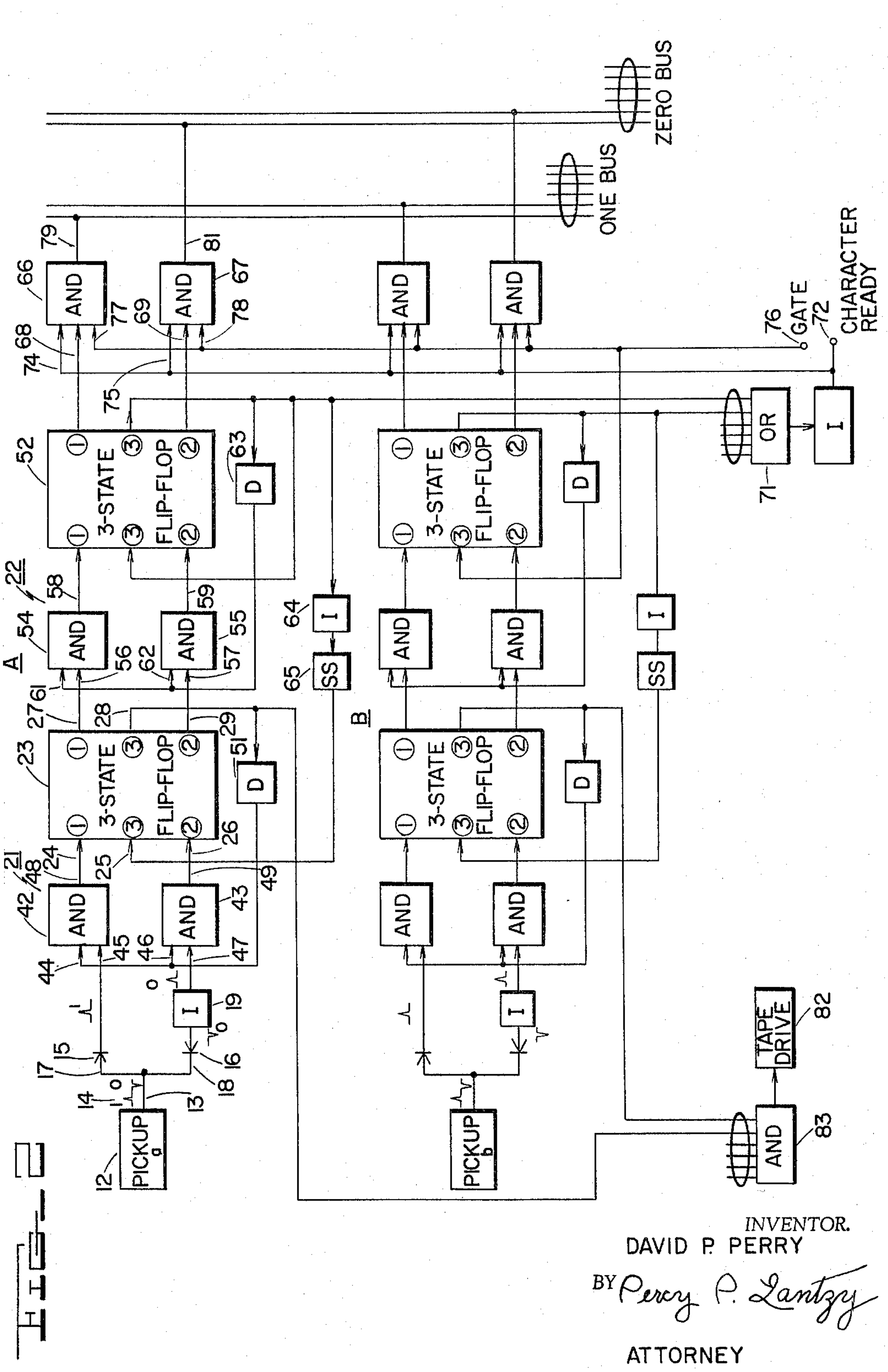
FIG. 2 is a block diagram illustrating the system of the invention.

Referring now to FIG. 2, two identical, equal length, parallel, buffer shift register chains or channels A and B are shown, it being understood that there will be provided one such channel for each tape track, i.e., six in the case of tape 10 of FIG. 1.

Each of the illustrated channels A and B comprises a conventional reproducing or pickup head 12 cooperating with the respective tape track and having an output circuit 13 in which a time-based electrical output signal 14 appears having the positive-going "1" pulses and negative-going "0" pulses therein. The single signal 14 having both the positive and negative-going "1" and "0" pulses therein is separated into two signals respectively having the positive and negative-going "1" and "0" pulses therein in any conventional manner, as by diodes 15 and 16 respectively oppositely connected in parallel output circuits 17 and 18. A conventional inverting circuit 19 is provided in output circuit 18 for inverting the negative-going "0" pulses so that both the "1" and "0" pulses in the parallel output circuits 17 and 18 are positive-going.

A plurality of serially coupled buffer-register stages are provided, two such stages 21 and 22 being shown, it being understood that additional buffer register stages may be provided if required in order to correct larger degrees of skew. Buffer register stage 21 comprises a three-state flip-flop circuit 23 to be hereinafter more fully described, having three input circuits 24, 25, and 26 and three corresponding output circuits 27, 28, and 29.

Figure 4:
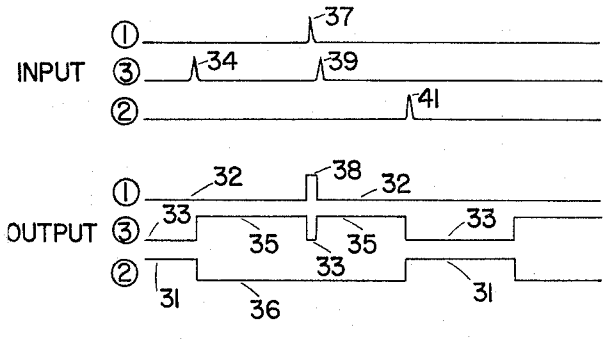
FIG. 4 is a diagram showing the output signal characteristics of the three-state flip-flop circuit of FIG. 3 in response to typical input pulses.

Referring briefly to FIG. 4, three-state flip-flop circuit 23 (and the remaining three-state flip-flop circuits employed in the system) are of the type wherein there is at all times provided in one of the output circuits, an output signal having a positive potential state with the remaining two output circuits having output signals therein having a negative potential state. If a positive-going pulse is applied to the input circuit corresponding to one of the output circuits which has a negative-going potential state signal therein, that output signal is abruptly changed to the positive potential state with the result that the output signal which formerly was in the positive potential state is abruptly changed to the negative potential state. This characteristic of a three-state flip-flop circuit is employed in the system of the invention to store either a "1" or a "0" input pulse resulting in a positive potential state output signal in the corresponding output line and a negative potential state output signal in the third output line indicating that the circuit is "full." If the stored information has been read out as will be hereinafter more fully described, the third output circuit has its potential state restored to the positive condition thus indicating that the circuit is "empty" and ready to accept another input signal.

Assuming now that output circuit 29 of three-state flip-flop circuit 23 (referred to as output circuit "2") has a positive state output signal 31 thereon, output circuit 27 (referred to as output circuit "1") will have a negative potential state output signal 32 thereon and output circuit 28 (referred to as output circuit "3") will likewise have a negative potential state output signal 33 thereon. As will be seen hereinafter, input and output circuits "1" and "2" of the three-state flip-flop circuits are employed for storage of the "1" and "0" pulses and input and output circuits "3" are employed respectively for resetting the circuit and for indicating the "full" and "empty" condition of the circuit, thus, the initial negative potential state signal 33 in output circuit "3" indicates that the three-state flip-flop circuit 23 is "full."

Assuming now that a positive-going pulse 34 is applied to input circuit "3" of flip-flop circuit 23, this will result in the potential state of output circuit "3" abruptly changing to the positive state 35 and the potential state of output circuit "2" abruptly changing to the negative state 36, the negative state 32 of output circuit "1" remaining unchanged. The positive potential state output signal 35 in output circuit "3" thus indicates that the flip-flop circuit is empty and ready to accept another "1" or "0" pulse on input circuit "1" or "2" respectively.

Assuming now that if a positive-going "1" pulse 37 is applied to input circuit "1," this will result in the potential state of output circuit "1" abruptly changing to the positive state 38 and the potential state of output circuit "3" abruptly changing to the negative state 33. Receipt of another positive-going pulse 39 on input circuit "3" will abruptly return the output signal in output circuit "3" to the positive potential state 35 and simultaneously restore the potential state of the output signal in output circuit "1" to the negative state 32. Application of a positive-going pulse 41 on input circuit "2" will abruptly change the potential state of output circuit "2" to the positive state 31 and simultaneously restore the output signal of output signal of output circuit "3" to the negative state 33.

Buffer register stage 21 further comprises a pair of AND circuits 42 and 43 respectively having two input circuits 44, 45 and 46, 47, and a single output circuit 48 and 49. Input circuits 45 and 47 of the AND circuits 42 and 43 are respectively connected to output circuits 17 and 18 of the pickup device 12 for respectively receiving the "1" and "0" pulses. Output circuits 48 and 49 of the AND circuits 42, 43 are respectively connected to input circuits 24 and 26 ("1" and "2") of three-state flip-flop circuit 23. Output circuit 28 ("3") of flip-flop circuit 23 is coupled to input circuits 44, 46 of AND circuits 42, 43 by a suitable delay device 51.

Buffer-register state 22 comprises a three-state flip-flop circuit 52 identical to circuit 23 and a pair of AND circuits 54, 55. Output circuits 27, 29 of flip-flop circuit 23 ("1" and "2") are coupled respectively to input circuits 56, 57 of AND circuits 54, 55 which have their output circuits 58, 59 respectively coupled to input circuits "1" and "2" of flip-flop circuit 52. Output circuit "3" of flip-flop circuit 52 is coupled to input circuits 61, 62 of AND circuits 54, 55 by suitable delay device 63. Output circuit "3" of flip-flop circuit 52 is further coupled to input circuit 25 ("3") of flip-flop circuit 23 by a conventional inverting circuit 64 and a suitable pulse generating circuit, such as a single shot multivibrator 65.

A pair of final AND circuits 66, 67 are provided having their input circuits 68, 69 respectively coupled to output circuits "1" and "2" of flip-flop circuit 52. Output circuit "3" of the final flip-flop circuit 52 is further coupled to OR circuit 71 along with the output circuits "3" of the final flip-flop circuits of the remaining five channels B–F. The output of OR circuit 71 is coupled to a "character ready" output terminal 72 by a conventional inverting circuit 73, the "character ready" output terminal 72 being coupled to input circuits 74, 75 of AND circuits 66, 67 and to the corresponding input circuits of the final AND circuits of the remaining channels B–F. An external gating signal for gating out the accumulated character bits in the final flip-flop circuits may be applied to a "gate" signal input terminal 76 which is coupled to input circuits 77, 78 of AND circuits 66, 67 and to the corresponding input circuits of the final AND circuits of the remaining channels B–F. Gate signal input terminal 76 is further coupled to the input circuits "3" of final three-state flip-flop circuit 52 and to the corresponding input circuit "3" of the final flip-flop circuits of the remaining channels B–F.

The output circuits 79, 81 of AND circuits 66, 67, and the output circuits of the final AND circuits of the other channels B–F are coupled to the utilization apparatus, shown here as being six "one" lines and six "zero" lines, the "1" bits and the "0" bits of a single character simultaneously appearing on respective "one" and "zero" lines.

A conventional drive 82 for tape 10 is provided and in order to enable drive 82 to advance tape 10 when the initial three-state flip-flop circuits 23 of all the channels A–F are in an empty condition, or to disable the tape drive 82 to prevent advance of the tape if any of the initial three-state flip-flop circuits 23 of any of the channels A–F are "full," the output circuit 28 ("3") of the initial three-state flip-flop circuit 23 of each of the channels A–F is coupled to an AND circuit 83 which, in turn, is coupled to enable tape drive 82 when the initial three-state flip-flop circuits 23 of all of the channels A–F have a positive state potential in their output circuits 28 ("3"), thus indicating that all of the initial flip-flop circuits are "empty" and thus able to accept new input signals.

Assuming now that all of the three-state flip-flop circuits of all of the buffer-shift register stages of all of the channels A–F are "empty," under these conditions, the output circuits "3" of all of the three-state flip-flop circuits will have a positive state potential output signal thereon which will be applied to the AND circuits of each of the stages. Likewise, all of the input circuits of AND circuit 83 have positive potentials supplied thereto from the output circuits "3" of the initial flip-flop circuits of each channel and thus tape drive 82 is enabled to advance the tape. Assume now that a "1" bit recorded on tape 10 in track "*a*" is reproduced by a pickup 12 of channel "A" resulting in an application of a positive-going "1" pulse on the AND circuit 42. Since a positive potential has been applied to the other input circuit 44 of AND circuit 42 from the output circuit "3" of the initial flip-flop circuit 23, a positive-going "1" pulse will be applied to input circuit "1" of flip-flop circuit 23 which in turn results in the abrupt change in the potential state of the output signal on output circuit "1" from negative to positive and with the simultaneous change in the potential state of the output signal of the output circuit "3" of flip-flop circuit 23 from positive to negative. Since a positive potential has been applied to AND circuit 54 from output circuit "3" of flip-flop circuit 52, the positive potential which now appears in output circuit "1" of flip-flop circuit 23 will pass through AND circuit 54 and be applied to input circuit "1" of the final flip-flop circuit 52. This will in turn result in an abrupt change in the potential state of the output signal in output circuit "1" of flip-flop circuit 52 from negative to positive and a simultaneous change in the potential state of the output signal in output circuit "3" of final flip-flop circuit 52 from positive to negative. This change in the potential state of positive to negative of the output signal in output circuit "3" of final flip-flop circuit 52 indicates that the "1" pulse has been transferred from the initial flip-flop circuit 23 to the final flip-flop circuit 52. It will be observed that the change in the potential state from positive to negative in the output circuits "3" of both the initial flip-flop circuit 23 and the final flip-flop circuit 52 have resulted in the application of negative potentials on the AND circuits 42, 43 of stage 21 and the AND circuits 54, 55 of stage 22 thus momentarily preventing the acceptance of new "1" or "0" pulses.

The change in the potential state from positive to negative in the output circuit "3" of the final flip-flop circuit 52 is inverted in inverting circuit 64 and energizes the pulse generator 65 to apply a positive-going pulse on input circuit "3" of the initial flip-flop circuit 23 thus restoring the potential state of output circuit "3" of initial flip-flop circuit 23 to the positive condition and the potential condition of the output signal of output circuit "1" to the negative condition. Restoration of the positive potential state in output circuit "3" of the initial flip-flop circuit 23 again applies a positive potential to AND circuits 42, 43 of the first stage 21 thus permitting acceptance of a new "1" or "0" pulse and again enabling the tape drive 82.

It will now be seen that when the output circuit "3" of the final flip-flop circuits 52 of all of the channels A–F are in the negative state, thus indicating that a "1" or "0" is stored in each of the final flip-flop circuits 52, or the OR circuits 71 will provide an output signal which is inverted in inverting circuit 73 to a positive-going signal applied to all of the final AND circuits along with the respective positive potential states from the final flip-flop circuits 52. Application of a positive-going gating signal on gating input circuit 76 will thus permit the positive state potentials applied to the final AND circuits from the final flip-flop circuit 52 to pass through to the output lines, the positive-going gating signal also being applied to the input circuits "3" of the final flip-flop circuits 52 so as to reset these flip-flops for reception of new "1" and "0" pulses.

Referring now to FIGS. 5A, B, C, there are shown three tracks *a*, *b*, and *c* of tape 10 together with the corresponding three buffer-shift register channels A, B, and C, each of which is assumed to have three buffer shift register stages, i.e., initial stages 21, final stages 22, and in this case one intermediate stage 84. In the interests of simplicity, tracks *a*, *b*, and *c* of tape 10 are shown as having only "1" bits thereon.

Figure 5:
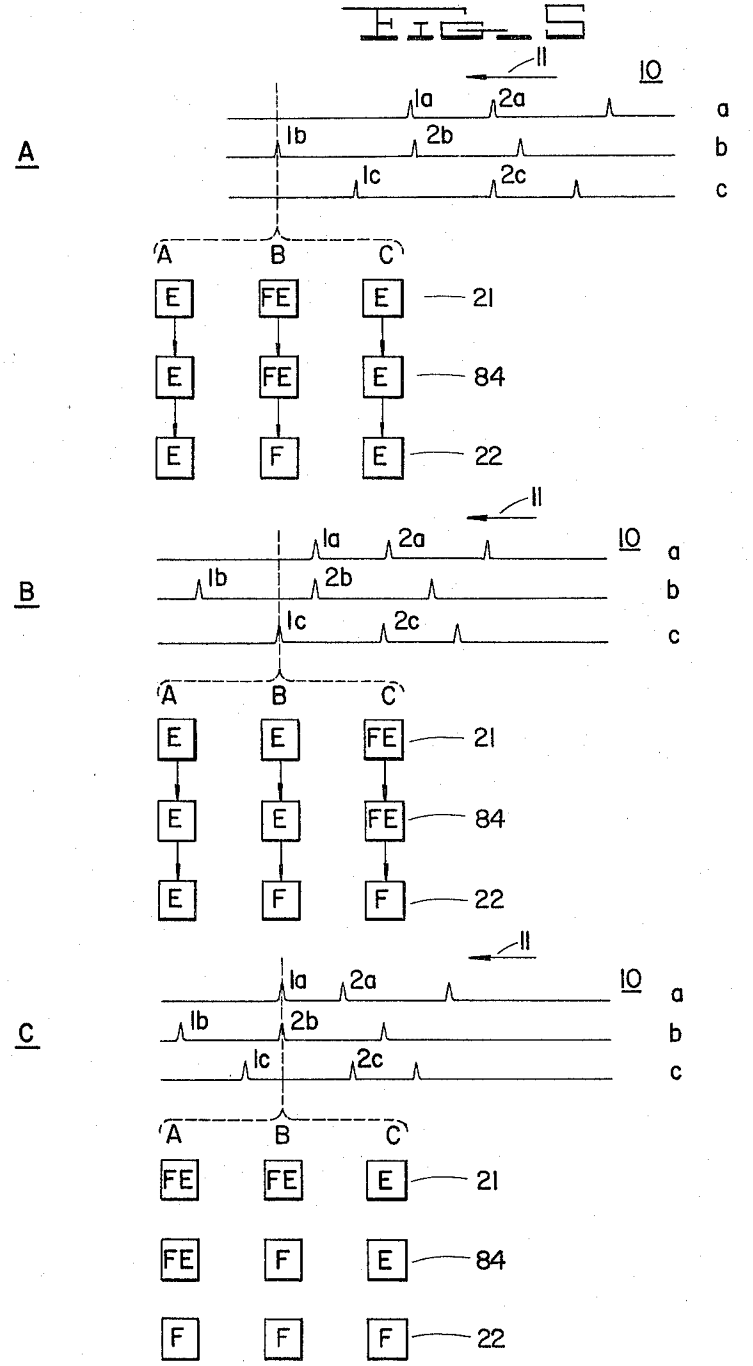
FIG. 5 shows diagrams useful in explaining the mode of operation of the system of the invention.

Referring now particularly to FIG. 5A, with tape 10 moving in the direction shown by the arrow 11, bit 1*b* will pass through stages 21B and 84B to the final stage 22B, stages 21B and 84B successively providing first a "full" and then an "empty" indication as the pulse passes through to the final stage 22B which then provides a "full" indication; in FIG. 5, an "empty" condition of a buffer shift register stage is shown by the letter "E," a switching from a "full" to an "empty" is shown by the symbol "F–E," and the "full" condition is shown by the symbol "F."

It will be seen that by the time the first pulse "1*b*" is stored in the final register 23B, the initial register 21B together with the initial register 21A and 21C are empty enabling advance of the tape 10 as above described.

Referring now to FIG. 5B, bit 1*c* in track *c* is next reproduced by the pickup device of channel C and successively passes through registers 21C, 84C, to register 22C which then provides a "full" indication, 21C and 84C, again switching from the "full" to the "empty" indication as the pulse "1*c*" passes through.

Referring now to FIG. 5C, bit 1*a* in track *a* which forms a part of the first character along with bits 1*b* in track *b* and 1*c* in track *c*, arrives at the reproducing location simultaneously with bit 2*b* in track *b* which forms a part of the second character. It will be seen that bit 1*a* passes through channel A, as above described, to the final register 22A. However, bit 2*b* passes through channel B only as far as intermediate stage 84B since the final stage 22B is full. It will now be observed that the bits 1(*a*), 1*b* and 1*c* are now all simultaneously stored in the final register stages 22A, 22B and 22C, and may be simultaneously read out by the application of a gating signal, as above described. When these pulses have been simultaneously read out, thus restoring each of the final stages 22A, 22B and 22C to the "empty" condition, then bit 2*b* is immediately transferred into the final stage 22B and is there stored while the other bits forming the second character have passed through channels A and C for storage in the final stages 22.

It will now be seen that by simultaneously reading out the output signals of all of the three-state flip-flop circuits of the final stages of the buffer shift register channels, any misalignment of the signals applied to the initial stages is corrected; any degree of skewing may be corrected with a sufficient number of buffer shift register stages, it being recalled that each channel must have the same number of stages. It will be seen that the "1" and "0" data signals propagate through the respective buffer shift register channels as fast as the buffer shift register stages are capable of switching; the final buffer shift register stages are loaded approximately one microsecond per stage after application of the signals to the initial or input buffer shift register stages. It will further be seen that skewing is accommodated by signals "piling up" in the intermeditae buffer shift register stages, all of the signals or bits forming a single character being simultaneously transferred or read out of the final stages in parallel to the external utilization apparatus such simultaneous reading out resetting all of the final stages in preparation for acceptance of signals from the respective preceding stages.

In any tape reading system embodying the invention, the minimum number of three-stable state stages required each of the buffer shift register chains depends upon the recurrence frequency of the character bits on the recording tracks and the maximum anticipated skew between corresponding bits on different tracks. For example, if successive character bits on each track are separated by one microsecond, and if corresponding bits on different tracks could be relatively skewed by as much as two microseconds, three buffer shift register stages will be required in each chain in order to insure reliable unskewing in the final buffer stages.

Figure 3:
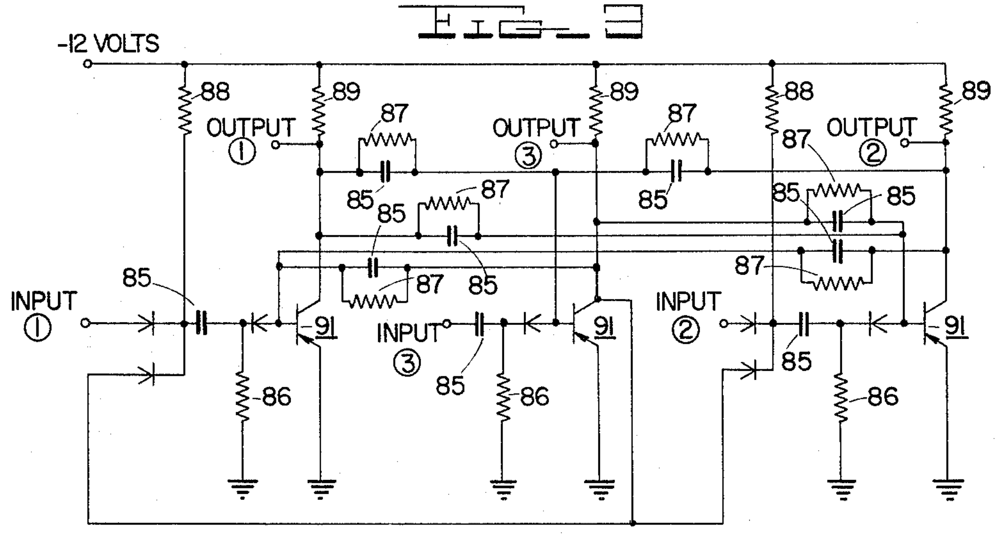
FIG. 3 is a schematic diagram of one three-stable flip-flop circuit employed in the system of FIG. 2.

Referring briefly to FIG. 3, a suitable circuit configuration for the three-state flip-flop circuits is shown having the component values listed below.

| | | |
|---|---|---|
| Capacitors **85** | micromicrofarads | 100 |
| Resistors **86** | ohms | 6,800 |
| Resistors **87** | do | 100,000 |
| Resistors **88** | do | 10,000 |
| Resistors **89** | do | 1,000 |
| Transistors **91** | | 2N599 (PNP) |

While I have described above the principles of my invention in connection with specific apparatus, it is to be clearly understood that this description is made only by way of example and not as a limitation to the scope of my invention.

What is claimed is:

1. In a system for reading a magnetic tape having binary coded information in "1" and "0" bit form recorded thereon in a plurality of parallel tracks and for eliminating skew between corresponding bits on said tracks: a plurality of parallel reading and buffer shift register channels corresponding to said plurality of tracks, each of said channels comprising pickup means having first and second output circuits for respectively providing first and second signals having pulses responsive to said "1" and "0" bits of the respective track, and a plurality of serially connected buffer register stages, each of said stages comprising three-state flip-flop circuit means having three input circuits and three output circuits with means therebetween for at all times respectively providing signals having one predetermined potential state in two of the output circuits and another predetermined potential state in the remaining output circuit, said last-named means changing the potential state of one output circuit from said one state to said other state responsive to application of a pulse to the corresponding input circuit whereby the potential of one of the remaining two output circuits is changed from said other state to said one state, and gating means respectively coupled to two of the input circuits of each of said flip-flop circuit means, the gating means of the first of said stages being respectively coupled to said first and second output circuits of said pickup means, the two output circuits of each said flip-flop circuit means corresponding to said two input circuits thereof being coupled respectively to the gating means of the next successive stage, the third output circuit of each said flip-flop circuit means being coupled to the gating means of the same stage for gating a signal to the respective input circuits in responsive to said third output circuit having said other potential state thereon, the third output circuit of the flip-flop circuit means of each of said stages above the first being coupled to the third input circuit of the flip-flop circuit means of the next preceding stage for applying a pulse thereto in response to said third output circuit being in said one potential state; final means coupled to the third output circuit of the flip-flop circuit means of the last stage of all of said channels for providing an indicating signal responsive to all of said last-named third output circuits being in said one state; and final gating means respectively coupling said two output circuits of said flip-flop circuit means of the last stage of all of said channels to output circuit means corresponding to said tracks, said final means being coupled to said final gating means for simultaneously gating signals to said output circuit means from said two output circuits of all of said last stages responsive to said indicating signal.

2. The system of claim 1 wherein said pickup means comprises a pickup device for providing a time-based signal having positive and negative going pulses corresponding respectively to said "1" and "0" bits, said first and second output circuits being coupled to said pickup device by means for respectively separating said positive and negtaive-going pulses, one of said first and second output circuits having pulse inverting means therein whereby said pulses of said first and second signals have the same polarity.

3. The system of claim 1 wherein said final gating means is coupled to the third input circuits of the flip-flop circuit means of the last stages of all of said channels for respectively applying pulses thereto responsive to said simultaneous gating of signals to said output circuit means.

4. The system of claim 1 wherein said gating means are AND circuits.

5. The system of claim 1 wherein the third output circuit of each said flip-flop circuit means is coupled to the gating means of the same stage by delay means.

6. The system of claim 1 wherein the third output circuit of the flip-flop circuit means of each of said stages above the first is coupled to the third input circuit of the next preceding stage by inverting means and pulse generating means.

7. The system of claim 1 wherein said final means comprises an OR circuit and inverting means.

8. The system of claim 1 further comprising means for driving said tape; and means coupled to the third output circuit of the flip-flop circuit means of the first stages of all of said channels for providing an enabling signal for said driving means when all of said third output circuits are in said other potential state.

9. In a system for reading a magnetic tape having binary coded information in "1" and "0" bit form recorded thereon in a plurality of parallel tracks and for eliminating skew in corresponding bits on said tracks: a plurality of parallel reading and buffer shift register channels corresponding to said plurality of tracks, each of said channels comprising a pickup device cooperating with a respective track on said tape for providing a time-based signal having positive and negative-going pulses corresponding respectively to said "1" and "0" bits, first and second output circuits coupled to said pickup device by means for respectively separating said positive and negative-going pulses thereof to provide first and second signals respectively having pulses responsive to said "1" and "0" bits, one of said first and second output circuits having pulse inverting means therein whereby said pulses of said first and second signals both have one polarity, and a plurality of serially connected buffer register stages, each of said stages comprising a three-state flip-flop circuit having first, second and third input circuits and corresponding first, second and third output circuits with switching means therebetween for at all times respectively providing output signals having said one polarity in one output circuit and the opposite polarity in the remaining two output circuits, said switching means abruptly changing the polarity of the output signal of one output circuit from said one polarity to said opposite polarity responsive to application of a pulse of said one polarity to the corresponding input circuit whereby the polarity of the output signal of the one remaining output circuit which had been said one polarity is changed to said other polarity, and AND circuit means respectively coupled to two of the input circuits of each of said flip-flop circuits, each of said AND circuits having at least two input circuits, one input circuit of each of the AND circuits of the first of said stages being coupled to a respective one of said first and second output circuits, the two output circuits of each of said flip-flop circuits corresponding to said two input circuits thereof being coupled respectively to one input circuit of the AND circuits of the next successive stage, the third output circuit of each said flip-flop circuits being coupled to another input circuit of both AND circuits of the same stage by delay means thereby applying pulses to the respective input circuits in response to said third output circuit having an output signal of said one polarity thereon, the third output circuit of the flip-flop circuit of each of said stages above the first being coupled to the third input circuit of the flip-flop circuit of the next preceding stage by inventing means and pulse generating means for applying a pulse thereto in response to said third output circuit having an output signal of said opposite polarity; an OR circuit coupled to the third output circuit of the flip-flop circuits of the last stage of all of said channels for providing an indicating signal responsive to all of said last-named third output circuits having output signals of said opposite polarity; final inventing means coupled to said OR circuit for inverting said indicating signal to said one polarity; two final AND circuit means for each of said channels each having at least three input circuits and an output circuit, said two output circuits of the flip-flop circuit of the last stage of each of said channels being respectively coupled to one of the input circuits of the respective two final AND circuits, said final inverting means being coupled to another input circuit of each of said final AND circuits; a gate signal input circuit adapted to be coupled to a gate signal source of said one polarity, said gate signal input circuit being coupled to a third input circuit of each of said final AND circuits whereby output signals of said one polarity are simultaneously passed to said output circuits of said final AND circuits responsive to said indicating signal and said gate signal, said gate signal input circuit being coupled to the third input circuits of the flip-flop circuits of the last stages of all of said channels for applying said gate signal thereto.

10. The system of claim 9 further comprising means for driving said tape; and another AND circuit having an output circuit and a plurality of input circuits coupled respectively to the third output circuits of the flip-flop circuits of the first stages of all of said channels for passing an enabling signal to said other AND circuit output circuit when all of said third output circuits have an output signal of said one polarity thereon, said output circuit of said other AND circuit being coupled to said drive means for enabling the same responsive to said enabling signal.

11. A system for reading parallel tracks of recorded binary information and for eliminating the effects of skew between corresponding bits detected on said parallel tracks comprising: a plurality of pickup means for reading trains of recorded binary signals stored on a corresponding plurality of parallel recording tracks, each said pickup means transmitting pulses of opposite binary value corresponding to the intelligence recorded on said corresponding tracks, a different buffer register chain connected to each said pickup means, all of said buffer register circuits having an identical number of serially connected stages, each said stage comprising storage means having three stable conditions, two of which correspond to the binary signal conditions transmitted by said pickup means, respectively, while the third stable condition represents an empty condition indicating that no information is presently being stored in said stage, each successive one of said stages including means whereby the respective storage means immediately assumes the condition of the immediately preceding stage when the said preceding stage is storing one of said binary signal conditions and the said stage is storing said empty condition, each successive one of said stages being coupled to the immediately preceding stage thereby to reset the storage means thereof to its empty condition as soon as binary information previously stored in said preceding stage has been transferred to and stored in the said stage, and means coupled to the final stage of each said buffer register chain for simultaneously transferring the signals stored therein in parallel fashion while simultaneously resetting all of said final stages into the said empty conditions thereof.

References Cited by the Examiner

UNITED STATES PATENTS

| | | | |
|---|---|---|---|
| 2,850,234 | 9/1958 | Bartelt et al. ------- | 340—174.1 |
| 3,103,000 | 9/1963 | Newman et al. ---- | 340—174.1 |

BERNARD KONICK, *Primary Examiner.*

V. P. CANNEY, *Assistant Examiner.*